(12) United States Patent
May

(10) Patent No.: US 6,853,171 B2
(45) Date of Patent: Feb. 8, 2005

(54) LOW LOSS MULTIPLE OUTPUT STAGE FOR A DC-TO-DC CONVERTER

(75) Inventor: Marcus W. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 42 days.

(21) Appl. No.: 10/603,555

(22) Filed: Jun. 25, 2003

(65) Prior Publication Data

US 2004/0114406 A1 Jun. 17, 2004

Related U.S. Application Data

(60) Provisional application No. 60/429,941, filed on Nov. 29, 2002.

(51) Int. Cl.[7] .............................. G05F 1/40; G05F 1/56
(52) U.S. Cl. ....................................... 323/283; 323/266
(58) Field of Search ................................. 323/222–226, 323/265–268, 270, 271, 273, 282, 283

(56) References Cited

U.S. PATENT DOCUMENTS 5,617,015 A * 4/1997 Goder et al. ................. 323/282
6,404,172 B1 * 6/2002 May ............................. 323/268
6,437,545 B2 * 8/2002 Sluijs ........................... 323/222

* cited by examiner

Primary Examiner—Matthew V. Nguyen
(74) Attorney, Agent, or Firm—Garlick, Harrison & Markison, LLP; Timothy W. Markison (57) ABSTRACT

A low loss multiple output stage of a boost converter includes a first output transistor having a first on-resistance, a second output transistor having a second on-resistance, a sink transistor, and a gate logic module. The sink transistor is operably coupled to allow energy to be provided to a first output via the first output transistor or to allow the energy to be provided to a second output via the gate logic module and the second output transistor based on a regulation signal. The gate logic module is operably coupled to, when the energy is to be provided to the first output, couple a gate and a well of the second output transistor to the first output; when the sink transistor is active, couple the gate and the well of the second output transistor to the second output, and when the energy is to be provided to the second output, couple the gate of the second transistor to ground and the well of the second output transistor to the second output. As such, a smaller transistor may be used as the load transistor for the lower output voltage without being compromised by the larger output voltage.

14 Claims, 4 Drawing Sheets

FIG. 1

FIG. 2
multi-function handheld device 40

FIG. 3

FIG. 4
DC to DC converter 26

FIG. 5
T1, T2, &/or T3

LOW LOSS MULTIPLE OUTPUT STAGE FOR A DC-TO-DC CONVERTER

This patent is claiming priority under 35 USC § 119(e) to provisionally filed patent application entitled MULTI-FUNCTION HANDHELD DEVICE, having a provisional Ser. No. of 60/429,941 and a provisional filing date of Nov. 29, 2002.

BACKGROUND OF THE INVENTION

1. Technical Field of the Invention

This invention relates generally to portable electronic equipment and more particularly to controlling of the powering such equipment.

2. Description of Related Art

As is known, integrated circuits (IC) are used in a wide variety of electronic equipment, including portable, or handheld, devices. Such handheld devices include personal digital assistants (PDA), CD players, MP3 players, DVD players, AM/FM radio, a pager, cellular telephones, computer memory extension (commonly referred to as a thumb drive), etc. Each of these handheld devices include one or more integrated circuits to provide the functionality of the device. For example, a thumb drive may include an integrated circuit for interfacing with a computer (e.g., personal computer, laptop, server, workstation, etc.) via one of the ports of the computer (e.g., Universal Serial Bus, parallel port, etc.) and at least one other memory integrated circuit (e.g., flash memory). As such, when the thumb drive is coupled to a computer data can be read from and written to the memory of the thumb drive. Accordingly, a user may store personalized information (e.g., presentations, Internet access account information, etc.) on his/her thumb drive and use any computer to access the information.

As another example, an MP3 player may include multiple integrated circuits to support the storage and playback of digitally formatted audio (i.e., formatted in accordance with the MP3 specification). As is known, one integrated circuit may be used for interfacing with a computer, another integrated circuit for generating a power supply voltage, another for processing the storage and/or playback of the digitally formatted audio data, and still another for rendering the playback of the digitally formatted audio data audible.

Integrated circuits have enabled the creation of a plethora of handheld devices, however, to be "wired" in today's electronic world, a person needs to posses multiple handheld devices. For example, one may own a cellular telephone for cellular telephone service, a PDA for scheduling, address book, etc., one or more thumb drives for extended memory functionality, an MP3 player for storage and/or playback of digitally recorded music, a radio, etc. Thus, even though a single handheld device may be relatively small, carrying multiple handheld devices on one's person can become quite burdensome.

Further, power consumption of a battery supplying energy to the handheld device is of great concern for manufacturers of such devices. As is know, the more quickly the battery is consumed, the more frequently the battery needs to be replaced, which, to most users, is an irritation. Thus, manufacturers want to minimize power consumption and, when achieved, the power reduction is highlighted to differentiate one manufacturer's product from another. However, may external devices require a 3.3 volt Input/Output interface with a system on a chip IC. This relatively high voltage is not power efficient for system on a chip. Thus, most system on chips internally use 3.3-volt devices for I/Os, including high-speed, low voltage I/Os.

Therefore, it is typical of system-on-a-chips to maintain dual supplies: a higher voltage for interfacing with external devices and a lower voltage supply for powering smaller process technology transistors of the system-on-a-chip that perform intensive computations. The need for two supplies requires the system-on-a-chip to include multiple dc-dc converters or one multi-output converter. The multi-output converters can provide additional system benefits because they require only a single inductor. However, their efficiency can be limited because the larger process technology transistors must be used even on the lower voltage output because the voltage swings that occur in producing the higher voltage output would damage smaller technology transistors if used for the lower voltage output. As is further known, the Ohmic loss in a switching transistor decreases nonlinearly as the process technology shrinks for the same gate area, so it would be very advantageous to utilize the smaller technology transistors on the lower voltage output.

Therefore, a need exists for a low-loss output stage for an on-chip boost DC-DC converter that allows for increased efficiency of the lower voltage output.

BRIEF SUMMARY OF THE INVENTION

The low loss multiple output stage of a boost converter of the present invention substantially meets these needs and others. In one embodiment, low loss multiple output stage of a boost converter includes a first load transistor, a sink transistor, a second load transistor, and a gate logic module. The first load transistor includes a gate, a drain, and a source, where the gate of the first load transistor is operably coupled to receive a first output regulation signal, the drain of the first load transistor is coupled to a first output, and the source of the first load transistor is operably coupled to an inductor. The sink transistor includes a gate, a drain, and a source, wherein the drain of the sink transistor is coupled to the source of the first load transistor, the source of the sink transistor is coupled to a return potential, and the gate of the sink transistor is operably coupled to receive a sink output regulation signal. The second load transistor includes a gate, a drain, and a source, wherein the gate of the second load transistor is operably coupled to receive a second output regulation signal, the drain of the second load transistor is coupled to a second output, and the source of the second load transistor is operably coupled to the inductor. The gate logic module is operably coupled to provide a voltage corresponding to the first output to the gate of the second load transistor when the first output regulation signal is active and the sink output regulation signal is inactive, and to provide the second output regulation signal to the gate of the second load transistor when the second output regulation signal is active and the sink output regulation signal is inactive, wherein thickness of a gate oxide layer of the second load transistor is less than thickness of a gate oxide layer of the first load transistor, and wherein the first output is of a greater voltage than the second output. As such, a smaller technology transistor may be used as the load transistor for the lower output voltage without being compromised by the production of the larger output voltage.

In another embodiment, a low loss multiple output stage of a boost converter includes a first output transistor having a first on-resistance, a second output transistor having a second on-resistance, wherein the first on-resistance has a resistance value that is greater than a resistance value of the second on-resistance, a sink transistor, and a gate logic module. The sink transistor is operably coupled to allow energy to be provided to a first output via the first output transistor or to allow the energy to be provided to a second output via the gate logic module and the second output transistor based on a regulation signal, wherein voltage of the first output is greater than voltage of the second output. The gate logic module is operably coupled to, when the energy is to be provided to the first output, couple a gate of the second output transistor to the first output and a well of the second output transistor to the first output; when the sink transistor is active, couple the gate and the well of the second output transistor to the second output, and when the energy is to be provided to the second output, couple the gate to ground and the well of the second output transistor to the second output. As such, using the same technology, a smaller transistor may be used as the load transistor for the lower output voltage without being compromised by the larger output voltage.

DETAILED DESCRIPTION OF THE INVENTION

Figure 1:
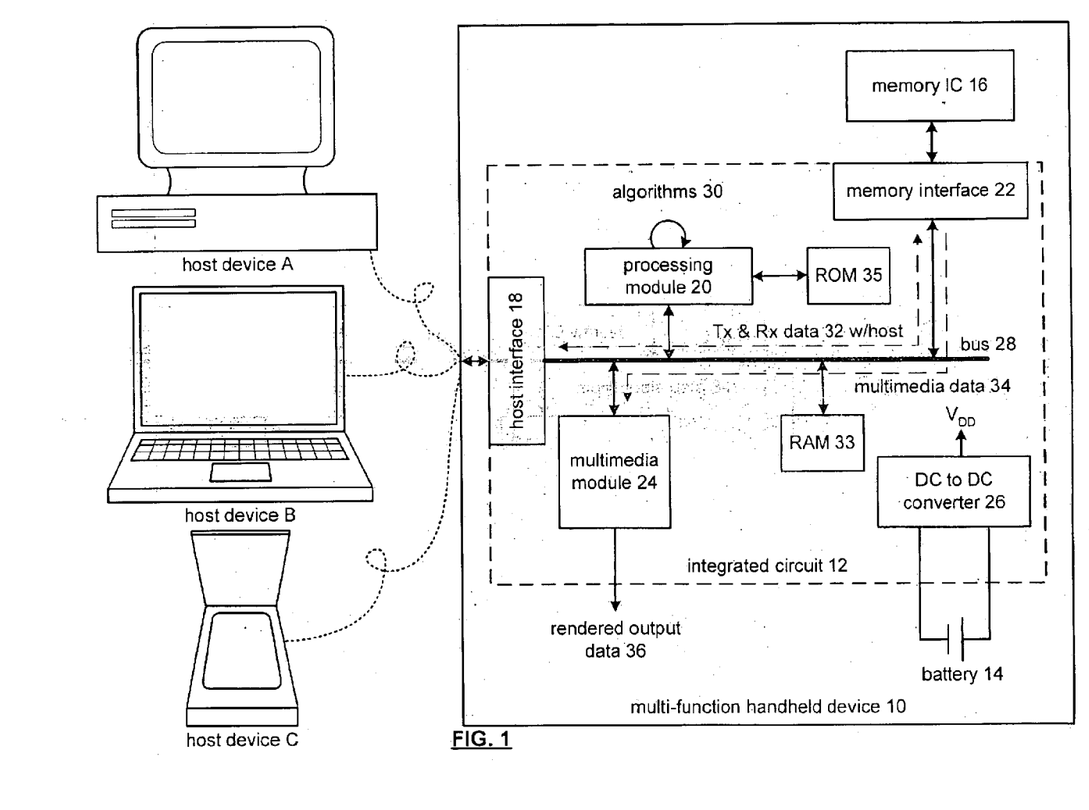
FIG. 1 is a schematic block diagram of a handheld device and corresponding integrated circuit in accordance with the present invention.

FIG. 1 is a schematic block diagram of a multi-function handheld device 10 and corresponding integrated circuit 12 operable coupled to a host device A, B, or C. The multi-function handheld device 10 also includes memory integrated circuit (IC) 16 and a battery 14. The integrated circuit 12 includes a host interface 18, a processing module 20, a memory interface 22, a multimedia module 24, a DC-to-DC converter 26, and a bus 28. The multimedia module 24 alone or in combination with the processing module 20 provides the functional circuitry for the integrated circuit 12. The DC-to-DC converter 26, which may be constructed in accordance with the teaching of U.S. Pat. No. 6,204,651, entitled METHOD AND APPARATUS FOR REGULATING A DC VOLTAGE, provides at least a first supply voltage to one or more of the host interface 18, the processing module 20, the multimedia module 24, and the memory interface 22. The DC-to-DC converter 26 may also provide $V_{DD}$ to one or more of the other components of the handheld device 10.

When the multi-function handheld device 10 is operably coupled to a host device A, B, or C, which may be a personal computer, workstation, server (which are represented by host device A), a laptop computer (host device B), a personal digital assistant (host device C), and/or any other device that may transceive data with the multi-function handheld device, the processing module 20 performs at least one algorithm 30, where the corresponding operational instructions of the algorithm 30 are stored in memory 16 and/or in memory incorporated in the processing module 20. The processing module 20 may be a single processing device or a plurality of processing devices. Such a processing device may be a microprocessor micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 20 implements one or more of its functions via a state machine, analog circuitry, digital circuitry, and/or logic circuitry, the associated memory storing the corresponding operational instructions is embedded with the circuitry comprising the state machine, analog circuitry, digital circuitry, and/or logic circuitry.

With the multi-function handheld device 10 in the first functional mode, the integrated circuit 12 facilitates the transfer of data between the host device A, B, or C and memory 16, which may be non-volatile memory (e.g., flash memory, disk memory, SDRAM) and/or volatile memory (e.g., DRAM). In one embodiment, the memory IC 16 is a NAND flash memory that stores both data and the operational instructions of at least some of the algorithms 30.

In this mode, the processing module 30 retrieves a first set of operational instructions (e.g., a file system algorithm, which is known in the art) from the memory 16 to coordinate the transfer of data. For example, data received from the host device A, B, or C (e.g., Rx data) is first received via the host interface module 18. Depending on the type of coupling between the host device and the handheld device 10, the received data will be formatted in a particular manner. For example, if the handheld device 10 is coupled to the host device via a USB cable, the received data will be in accordance with the format proscribed by the USB specification. The host interface module 18 converts the format of the received data (e.g., USB format) into a desired format by removing overhead data that corresponds to the format of the received data and storing the remaining data as data words. The size of the data words generally corresponds directly to, or a multiple of, the bus width of bus 28 and the word line size (i.e., the size of data stored in a line of memory) of memory 16. Under the control of the processing module 20, the data words are provided, via the memory interface 22, to memory 16 for storage. In this mode, the handheld device 10 is functioning as extended memory of the host device (e.g., like a thumb drive).

In furtherance of the first functional mode the host device may retrieve data (e.g., Tx data) from memory 16 as if the memory were part of the computer. Accordingly, the host device provides a read command to the handheld device, which is received via the host interface 18. The host interface 18 converts the read request into a generic format and provides the request to the processing module 20. The processing module 20 interprets the read request and coordinates the retrieval of the requested data from memory 16 via the memory interface 22. The retrieved data (e.g., Tx data) is provided to the host interface 18, which converts the format of the retrieved data from the generic format of the handheld device into the format of the coupling between the handheld device and the host device. The host interface 18 then provides the formatted data to the host device via the coupling.

The coupling between the host device and the handheld device may be a wireless connection or a wired connection. For instance, a wireless connection may be in accordance with Bluetooth, IEEE 802.11(a), (b) or (g), and/or any other wireless LAN (local area network) protocol, IrDA, etc. The wired connection may be in accordance with one or more Ethernet protocols, Firewire, USB, etc. Depending on the particular type of connection, the host interface module 18 includes a corresponding encoder and decoder. For example, when the handheld device 10 is coupled to the host device via a USB cable, the host interface module 18 includes a USB encoder and a USB decoder.

As one of average skill in the art will appreciate, the data stored in memory 16, which may have 64 Mbytes or greater of storage capacity, may be text files, presentation files, user profile information for access to varies computer services (e.g., Internet access, email, etc.), digital audio files (e.g., MP3 files, WMA—Windows Media Architecture-, MP3 PRO, Ogg Vorbis, AAC—Advanced Audio Coding), digital video files [e.g., still images or motion video such as MPEG (motion picture expert group) files, JPEG (joint photographic expert group) files, etc.], address book information, and/or any other type of information that may be stored in a digital format. As one of average skill in the art will further appreciate, when the handheld device 10 is coupled to the host device A, B, or C, the host device may power the handheld device 10 such that the battery is unused.

When the handheld device 10 is not coupled to the host device, the processing module 20 executes an algorithm 30 to detect the disconnection and to place the handheld device in a second operational mode. In the second operational mode, the processing module 20 retrieves, and subsequently executes, a second set of operational instructions from memory 16 to support the second operational mode. For example, the second operational mode may correspond to MP3 file playback, digital dictaphone recording, MPEG file playback, JPEG file playback, text messaging display, cellular telephone functionality, and/or AM/FM radio reception. Each of these functions is known in the art, thus no further discussion of the particular implementation of these functions will be provided except to further illustrate the concepts of the present invention.

In the second operational mode, under the control of the processing module 20 executing the second set of operational instructions, the multimedia module 24 retrieves multimedia data 34 from memory 16. The multimedia data 34 includes at least one of digitized audio data, digital video data, and text data. Upon retrieval of the multimedia data, the multimedia module 24 converts the data 34 into rendered output data 36. For example, the multimedia module 24 may convert digitized data into analog signals that are subsequently rendered audible via a speaker or via a headphone jack. In addition, or in the alternative, the multimedia module 24 may render digital video data and/or digital text data into RGB (red-green-blue), YUV, etc., data for display on an LCD (liquid crystal display) monitor, projection CRT, and/or on a plasma type display. The multimedia module 24 will be described in greater detail with reference to FIGS. 2 and 3.

As one of average skill in the art, the handheld device 10 may be packaged similarly to a thumb drive, a cellular telephone pager (e.g., text messaging), a PDA, an MP3 player, a radio, and/or a digital dictaphone and offer the corresponding functions of multiple ones of the handheld devices (e.g., provide a combination of a thumb drive and MP3 player/recorder, a combination of a thumb drive, MP3 player/recorder, and a radio, a combination of a thumb drive, MP3 player/recorder, and a digital dictaphone, combination of a thumb drive, MP3 player/recorder, radio, digital dictaphone, and cellular telephone, etc.).

Figure 2:
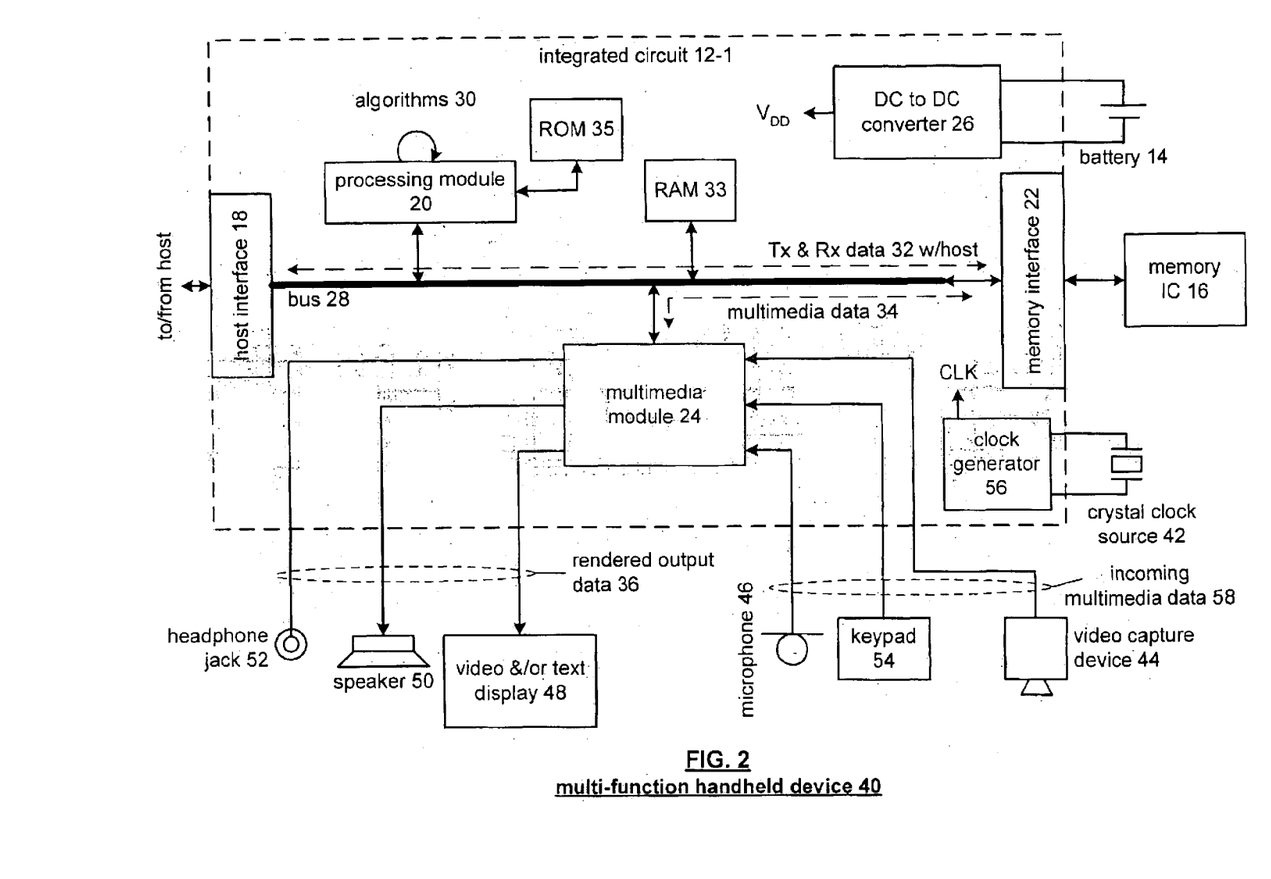
FIG. 2 is a schematic block diagram of another handheld device and corresponding integrated circuit in accordance with the present invention.

FIG. 2 is a schematic block diagram of another handheld device 40 and a corresponding integrated circuit 12-1. In this embodiment, the handheld device 40 includes the integrated circuit 12-1, the battery 14, the memory 16, a crystal clock source 42, one or more multimedia input devices (e.g., one or more video capture device(s) 44, keypad(s) 54, microphone(s) 46, etc.), and one or more multimedia output devices (e.g., one or more video and/or text display(s) 48, speaker(s) 50, headphone jack(s) 52, etc.). The integrated circuit 12-1 includes the host interface 18, the processing module 20, the memory interface 22, the multimedia module 24, the DC-to-DC converter 26, and a clock generator 56, which produces a clock signal (CLK) for use by the other modules. As one of average skill in the art will appreciate, the clock signal CLK may include multiple synchronized clock signals at varying rates for the various operations of the multi-function handheld device.

Handheld device 40 functions in a similar manner as handheld device 10 when exchanging data with the host device (i.e., when the handheld device is in the first operational mode). In addition, while in the first operational mode, the handheld device 40 may store digital information received via one of the multimedia input devices 44, 46, and 54. For example, a voice recording received via the microphone 46 may be provided as multimedia input data 58, digitized via the multimedia module 24 and digitally stored in memory 16. Similarly, video recordings may be captured via the video capture device 44 (e.g., a digital camera, a camcorder, VCR output, DVD output, etc.) and processed by the multimedia module 24 for storage as digital video data in memory 16. Further, the key pad 54 (which may be a keyboard touch screen interface, or other mechanism for inputting text information) provides text data to the multimedia module 24 for storage as digital text data in memory 16. In this extension of the first operational mode, the processing module 20 arbitrates write access to the memory 16 among the various input sources (e.g., the host and the multimedia module).

When the handheld device 40 is in the second operational mode (i.e., not connected to the host), the handheld device may record and/or playback multimedia data stored in the memory 16. Note that the data provided by the host when the handheld device 40 was in the first operational mode includes the multimedia data. The playback of the multimedia data is similar to the playback described with reference to the handheld device 10 of FIG. 1. In this embodiment, depending on the type of multimedia data 34, the rendered output data 36 may be provided to one or more of the multimedia output devices. For example, rendered audio data may be provided to the headphone jack 52 an/or to the speaker 50, while rendered video and/or text data may be provided to the display 48.

The handheld device 40 may also record multimedia data 34 while in the second operational mode. For example, the handheld device 40 may store digital information received via one of the multimedia input devices 44, 46, and 54.

Figure 3:
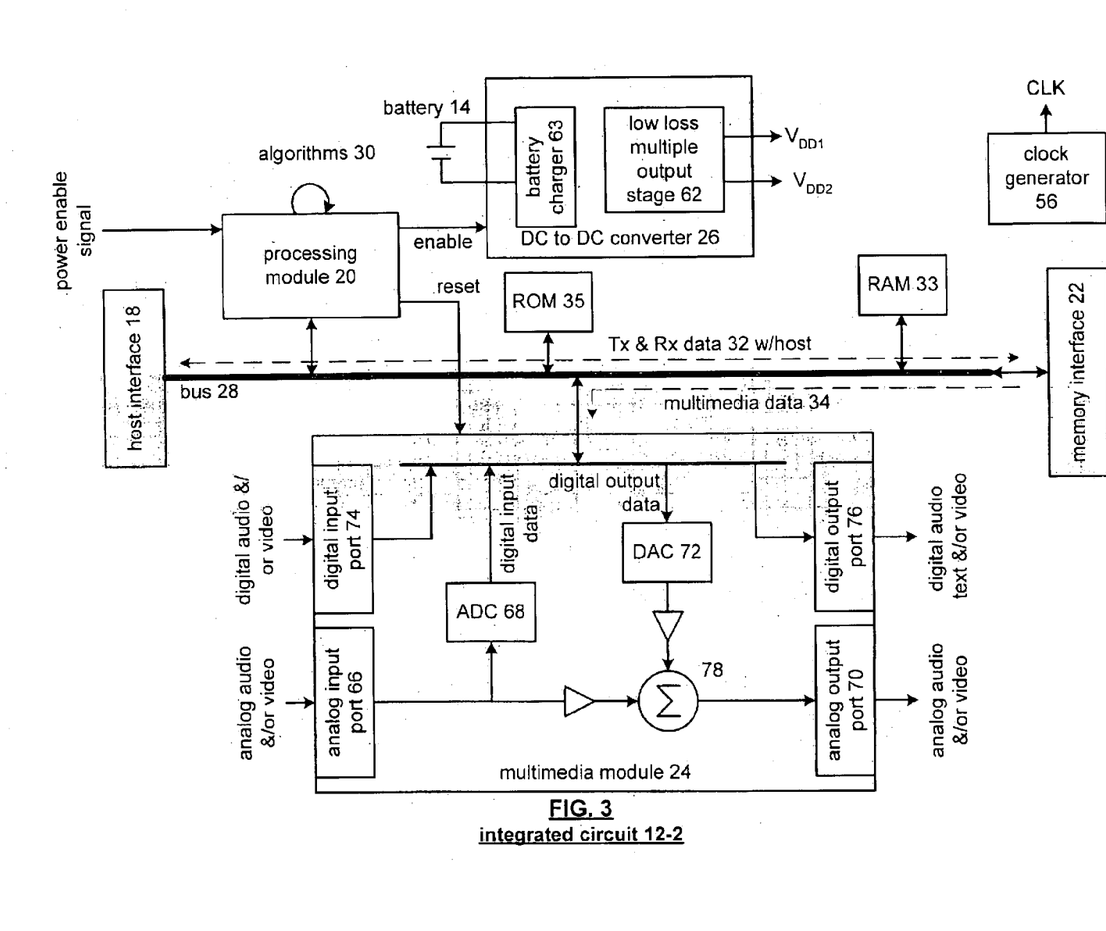
FIG. 3 is a schematic block diagram of another integrated circuit in accordance with the present invention.

FIG. 3 is a schematic block diagram of an integrated circuit 12-2 that may be used in a multi-function handheld device. The integrated circuit 12-2 includes the host interface 18, the processing module 20, the DC-to-DC converter 26, memory 60, the clock generator 56, the memory interface 22, the bus 28 and the multimedia module 24. The DC-to-DC converter 26 includes a first output section 62, and a second output section 64 to produce a first and second output voltage ($V_{DD1}$ and $V_{DD2}$), respectively. Typically, $V_{DD1}$ will be greater than $V_{DD2}$, were $V_{DD1}$ is used to source analog sections of the processing module 20, the host interface 18, the memory interface 22, and/or the multimedia module 22 and $V_{DD2}$ is used to source the digital sections of these modules. The DC-to-DC converter 26 may further include a battery charger 63 and a low loss multiple output stage 62. The battery charger 63 is operable to charge the battery 14 from power it receives via the physical coupling (e.g., via a USB cable) to the host device when the multi-function handheld device is physically coupled to the host device. The particular implementation of the battery charger 63 is dependent on the type of battery being used and such implementations are known in the art, thus no further discussion will be provided regarding the battery charger 63 except to further illustrate the concepts of the present invention.

The multimedia module 24 includes an analog input port 66, an analog to digital converter (ADC) 68, an analog output port 70, a digital to analog converter (DAC) 72, a digital input port 74, a digital output 76, and an analog mixing module 78. The analog input port 66 is operably coupled to receive analog input signals from one or more sources including a microphone, an AM/FM tuner, a line in connection (e.g., headphone jack of a CD player), etc. The received analog signals are provided to the ADC 68, which produces digital input data therefrom. The digital input data may be in a pulse code modulated (PCM) format and stored as such, or it may be provided to the processing module 20 for further audio processing (e.g., compression, MP3 formatting, etc.) The digital input data, or the processed version thereof, is stored in memory 16 as instructed by the processing module 20.

The digital input port 74 is operably coupled to receive digital audio and/or video input signals from, for example, a digital camera, a camcorder, etc. The digital audio and/or video input signals may be stored in memory 16 under the control of the processing module 20. As one of average skill in the art will appreciate, the audio and/or video data (which was inputted as analog signals or digital signals) may be stored as raw data (i.e., the signals received are stored as is in designated memory locations) or it may be stored as processed data (i.e., compressed data, MPEG data, MP3 data, WMA data, etc.).

The DAC 72 receives multimedia data 34 as digital output data and converts it into analog video and/or audio output data that is provided to the mixing module 79. When the output of the DAC 72 is the only input to the mixing module 78, the mixing module 78 outputs the analog video and/or audio output data to the analog output port 70. The analog output port 70 may be coupled to one or more of the speaker, headphone jack, and a video display. The mixing module 78 may mix analog input signals received via the analog input port 66 with the output of DAC 72 to produce a mixed analog signal that is provided to the analog output port 70. Note that the buffers in series with the inputs of the mixing module 78 may have their gains adjusted and/or muted to enable selection of the signals at various gain settings provided to the mixing module 78 and subsequently outputted via the analog output port 70.

The digital output port 76 is operably coupled to output the digital output data (i.e., the multimedia data 34 in a digital format). The digital output port 76 may be coupled to a digital input of a video display device, another handheld device for direct file transfer, etc.

As one of average skill in the art will appreciate, the multimedia module 24 may include more or less components than the components shown in FIG. 3 or include multiple analog and/or digital input and/or output ports. For example, for a playback mode of digital audio files, the multimedia module 24 may only include the DAC 72 and the analog output port 70 that is coupled to the headphone jack and/or to the speaker. As another example, for recording voice samples (i.e., as a digital dictaphone), the multimedia module 24 may include the analog input port 66 coupled to the microphone and the ADC.

Figure 4:
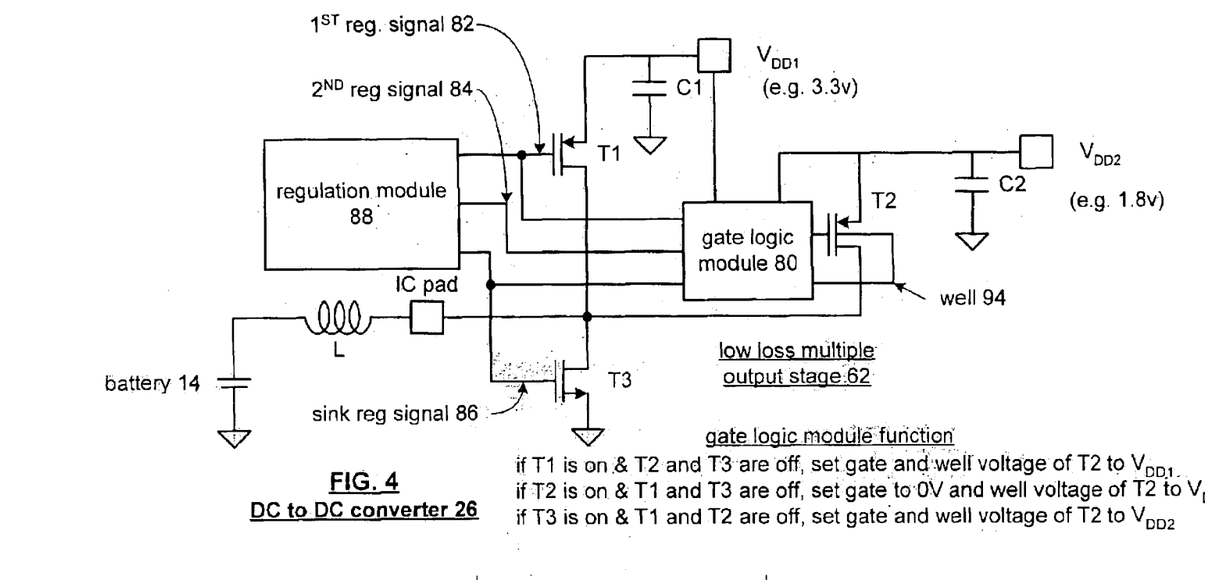
FIG. 4 is a schematic block diagram of a DC-to-DC converter in accordance with the present invention.

FIG. 4 is a schematic block diagram of the DC-to-DC converter 26. As shown, the DC-to-DC converter 26 includes a regulation module 88, a source transistor T3, two output transistors T1 and T2, a gate logic module 80, two output capacitors C1 and C2, an off-chip inductor L, and an off-chip battery 14. In operation, the DC-to-DC converter 26 produces a $1^{st}$ and $2^{nd}$ output voltages $V_{DD1}$ and $V_{DD2}$. In this configuration, the DC-to-DC converter 26 is acting in a boost mode. Accordingly, during one phase of a regulation cycle, the regulation module 88 activates transistor T3 via a sink regulation signal 86 and keeps transistors T1 and T2 off. In this configuration, energy is built up across inductor L. During a next interval of the regulation cycle, the regulation module 88 activates either transistor T1, via a first regulation signal 82, or transistor T2, via a second regulation signal 84. If, for example T1 is activated, at least some of the energy stored in inductor L is provided via T1 to capacitor C1 to produce output $V_{DD1}$ (Which may be a 3.3 volt supply voltage). Alternatively, when transistor T2 is activated, the energy from the inductor is provided to capacitor C2 to produce output $V_{DD2}$ (which may be a 1.8 volt supply voltage).

Figure 5:
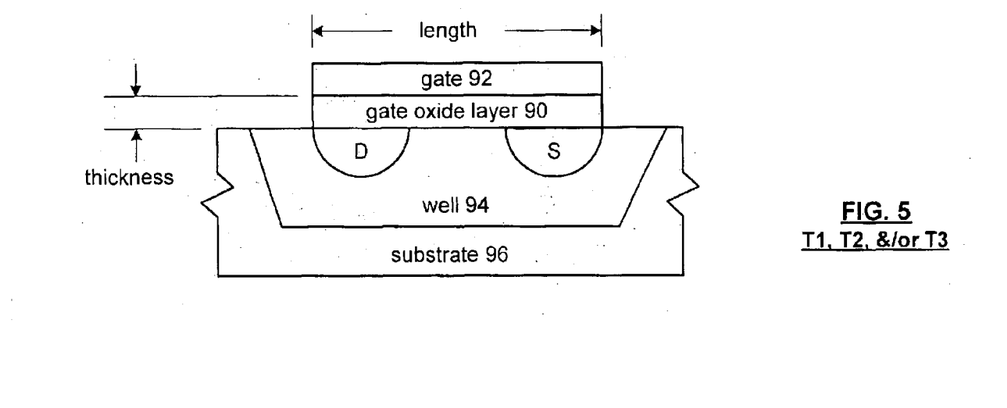
FIG. 5 is a schematic diagram of a CMOS field effect transistor in accordance with the present invention.

If, for example, output $V_{DD1}$ is 3.3 volts and output $V_{DD2}$ is 1.8 volts, without the gate logic module 80, transistor T2 would be required to be a 3.3-volt transistor to withstand the voltage swing when energy is provided to transistor T1 even though the second output is only 1.8 volts. As one of average skill in the art will appreciate, the thickness of a gate oxide layer of a transistor and the length of the transistor are larger for larger voltage transistors than from smaller voltage transistors. FIG. 5 is a schematic diagram of a field effect transistor that may be implemented using CMOS technology for the output transistors T1 and T2. As shown, the transistor includes a gate 92, a gate oxide layer 90, a well 94, a drain (D), and a source (S) formed on a substrate 96. The larger the transistor voltage (i.e., the drain-source voltage) the thicker the gate oxide layer 90 needs to be and the longer the length of the transistor needs to be. For example, a 1.8 volt transistor may be approximately $1/4^{th}$ the size of a 3.3 volt transistor since it requires approximately half the gate oxide layer thickness and approximately half the length of a 3.3 volt transistor. As one of average skill in the art will also appreciate, as the length of a transistor increases, its state transition switching slows down (i.e., changing from an on-state to an off-state), its resistance increases, and its power consumption increases. Continuing with the above example a 3.3-volt transistor has slower transition switching, has a greater on resistance, and hence consumes more power than a 1.8-volt transistor.

Returning to the discussion of FIG. 4, it is desirable to use a 1.8 volt transistor for the second output without damaging the transistor when the 3.3 volt output is being charged. The gate logic module 80 achieves this. In operation, the gate logic module 80 monitors the first regulation signal 82, the second regulation signal 84 and the sink regulation signal 86 to control the voltage seen by the second output transistor T2 to safe levels for a 1.8 volt transistor. For instance, when the first regulation signal is active (i.e., T1 is on and T2 and T3 are off), the gate logic module 80 couples the gate and well 94 of transistor T2 to $V_{DD1}$ (i.e., the first output). With the source of transistor T2 coupled to the second output $V_{DD2}$ and the drain of transistor T2 coupled to $V_{DD1}$ via transistor T1, the coupling of the gate and the well of transistor T2 keeps the voltage differential between the nodes of transistor T2 (i.e., the drain, source, gate, and well) at a maximum of $V_{DD1}$-$V_{DD2}$. Thus, if $V_{DD1}$ is 3.3 volts and $V_{DD2}$ is 1.8 voltages, T2 may be a 1.8 volt transistor and not be damaged when $V_{DD1}$ is receiving energy or T3 is charging. Note that T3 is substantially the same size as T1.

When the second regulation signal 84 is active (i.e., indicating that T2 should be on and T1 and T3 off), the gate logic module 80 couples the gate of transistor T2 to ground and the well 94 of transistor T2 to $V_{DD2}$, thereby turning transistor T2 on. When the sink regulation signal 86 is active (i.e., T3 is on and T1 and T2 are off), the gate logic module 80 couples the gate of transistor T2 to $V_{DD2}$ and may couple the well 94 to $V_{DD2}$. In this state, transistor T2 is off and is not exposed to a voltage level that may damage it. By using a smaller technology transistor for VDD2, the power losses associated with transistor T2 are reduced. For example, Ohmic loss in transistor T2 is reduced by a factor of 4 when a 1.8 volt transistor can be used instead of a 3.3 volt transistor, when the transistors are of the same technology. Alternatively, a smaller device can be used.

As one of average skill in the art will appreciate, the term "substantially" or "approximately", as may be used herein provides an industry-accepted tolerance to its corresponding term. Such an industry-accepted tolerance ranges from less than one percent to twenty percent and corresponds to but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for providing current limiting of one or more outputs of an on-chip DC-to-DC converter in a lossless manner and does so with minimal additional low power logic circuitry within the regulation module to analyze and limit the duty cycle of an output. As one of average skill in the art will appreciate, other embodiments may be derived from the teachings of the present invention without deviating from the scope of the claims.

What is claimed is:

1. A low loss multiple output stage of a DC-to-DC converter comprises:
   first load transistor having a gate, a drain, and a source, wherein the gate of the first load transistor is operably coupled to receive a first output regulation signal, the source of the first load transistor is coupled to a first output, and the drain of the first load transistor is operably coupled to an inductor;
   sink transistor having a gate, a drain, and a source, wherein the drain of the sink transistor is coupled to the drain of the first load transistor, the source of the sink transistor is coupled to a return potential and the gate of the sink transistor is operably coupled to receive a sink output regulation signal;
   second load transistor having a gate, a drain, and a source, wherein the gate of the second load transistor is operably coupled to a second output regulation signal, the source of the second load transistor is coupled to a second output, and the drain of the second load transistor is operably coupled to the inductor; and
   gate logic module operably coupled to:
      provide a voltage corresponding to the first output to the gate of the second load transistor when the first output regulation signal is active and the sink output regulation signal is inactive,
      provide the second output regulation signal to the gate of the second load transistor when the second output regulation signal is active and the sink output regulation signal in inactive.

2. The low loss multiple output stage of claim 1, wherein the gate logic module further provides the voltage corresponding to the first output to a well of the second load transistor when the first output regulation signal is active and couples the well of the second load transistor to the second output when the second output regulation signal is active.

3. The low loss multiple output stage of claim 1, wherein the gate logic module further provides a voltage corresponding to the second output voltage to the gate of the second output transistor and to a well of the second output transistor when the sink output regulation signal is active.

4. The low loss multiple output stage of claim 1 further comprises a gate oxide layer of the sink transistor being of similar thickness to the gate oxide layer of the first load transistor and a thickness of the a gate oxide layer of the second load transistor is less than thickness of the gate oxide layer of the first load transistor, wherein the first output is of a greater voltage than the second output.

5. A low loss multiple output stage of a DC-to-DC converter comprises:
   first output transistor having a first on-resistance;
   second output transistor having a second on-resistance, wherein the first on-resistance has a resistance value that is greater than a resistance value of the second on-resistance;
   gate logic module operably coupled to the second output transistor; and
   sink transistor operably coupled to allow energy to be provided to a first output via the first output transistor or to allow the energy to be provided to a second output via the gate logic module and the second output transistor based on a regulation signal, wherein voltage of the first output is greater than voltage of the second output, and wherein:
      when the energy is to be provided to the first output, the gate logic module couples a gate and a well of the second output transistor to the first output,
      when the sink transistor is active, the gate logic module couples the gate and the well of the second output transistor to the second output, and
      when the energy is to be provided to the second output, the gate logic module couples the gate of the second output transistor to an output ground and the well of the second output transistor to the second output.

6. The low loss multiple output stage of claim 5 further comprises:

the first output transistor having a gate oxide layer thickness of a first thickness and a gate length of a first length to produce the first on-resistance; and the second output transistor having a gate oxide layer thickness of a second thickness and a gate length of a second length to produce the second on-resistance, wherein the first thickness is greater than the second thickness and the first length is greater than the second length.

7. The low loss multiple output stage of claim 5 further comprises:

the first output having a voltage of approximately 3.3 volts; and the second output having a voltage of approximately 1.8 volts, wherein the second on-resistance is approximately one-fourth the first on-resistance.

8. An on-chip DC-to-DC converter comprises:

a regulation module operably coupled to produce a first output regulation signal and a sink output regulation signal to regulate a first output and to produce a second output regulation signal and the sink output regulation signal to regulate a second output, wherein voltage of first output is greater than voltage of the second output;

first output capacitance operably coupled to the first output;

second output capacitance operably coupled to the second output;

an integrated circuit (IC) pad for coupling to ail external inductor;

low loss output stage includes:

first load transistor having a gate, a drain, and a source, wherein the gate of the first load transistor is operably coupled to receive the first output regulation signal, the source of the first load transistor is coupled to the first output, and the drain of the first load transistor is operably coupled to the IC pad;

sink transistor having a gate, a drain, and a source, wherein the drain of the sink transistor is coupled to the source of the first load transistor, the source of the sink transistor is coupled to a return potential, and the gate of the sink transistor is operably coupled to receive a sink output regulation signal;

second load transistor having a gate, a drain, and a source, wherein the gate of the second load transistor is operably coupled to receive a second output regulation signal, the source of the second load transistor is coupled to a second output, and the drain of the second load transistor is operably coupled to the inductor; and gate logic module operably coupled to:

provide a voltage corresponding to the first output to the gate of the second load transistor when the first output regulation signal is active and the sink output regulation signal is inactive, and provide the second output regulation signal to the gate of the second load transistor when the second output regulation signal is active and the sink output regulation signal in inactive.

9. The on-chip DC-to-DC converter of claim 8, wherein the gate logic module further provides the voltage corresponding to the first output to a well of the second load transistor when the first output regulation signal is active and couples the well of the second load transistor to the second output when the second output regulation signal is active.

10. The on-chip DC-to-DC converter of claim 8, wherein the gate logic module further provides a voltage corresponding to the second output to the gate of the second output transistor and to a well of the second output transistor when the sink output regulation signal is active.

11. The on-chip DC-to-DC converter of claim 8 further comprises a gate oxide layer of the sink transistor being of similar thickness to the gate oxide layer of the first load transistor and a thickness of the a gate oxide layer of the second load transistor is less than thickness of the gate oxide layer of the first load transistor, wherein the first output is of a greater voltage than the second output.

12. An on-chip DC-to-DC converter comprises:

a regulation module operably coupled to produce a first output regulation signal and a sink output regulation signal to regulate a first output and to produce a second output regulation signal and the sink output regulation signal to regulate a second output, wherein voltage of first output is greater than voltage of the second output;

first output capacitance operably coupled to the first output;

second output capacitance operably coupled to the second output;

an integrated circuit (IC) pad for coupling to an external inductor;

low loss output stage includes:

first output transistor having a first on-resistance;

second output transistor having a second on-resistance, wherein the first on-resistance has a resistance value that is greater than a resistance value of the second on-resistance;

gate logic module operably coupled to the second output transistor; and sink transistor operably coupled to allow energy to be provided to a first output via the first output transistor or to allow the energy to be provided to a second output via the gate logic module and the second output transistor based on a regulation signal, wherein voltage of the first output is greater than voltage of the second output, and wherein:

when the energy is to be provided to the first output, the gate logic module couples a gate and a well of the second output transistor to the first output, when the sink transistor is active, the gate logic module couples the gate and the well of the second output transistor to the second output, and when the energy is to be provided to the second output, the gate logic module couples the gate of the second output transistor to an output ground and the well of the second output transistor to the second output.

13. The on-chip DC-to-DC converter of claim 12 further comprises:

the first output transistor having a gate oxide layer thickness of a first thickness and a gate length of a first length to produce the first on-resistance; and the second output transistor having a gate oxide layer thickness of a second thickness and a gate length of a second length to produce the second on-resistance, wherein the first thickness is greater than the second thickness and the first length is greater than the second length.

14. The on-chip DC-to-DC converter of claim 12 further comprises:

the first output having a voltage of approximately 3.3 volts; and the second output having a voltage of approximately 1.8 volts, wherein the second on-resistance is approximately one-fourth the first on-resistance.

* * * * *